(12) United States Patent
Paczkowski et al.

(10) Patent No.: US 10,936,422 B1
(45) Date of Patent: Mar. 2, 2021

(54) RECOVERY OF VIRTUAL NETWORK FUNCTION (VNF) BOOT FUNCTIONALITY

(71) Applicant: Sprint Communications Company L.P., Overland Park, KS (US)

(72) Inventors: Lyle Walter Paczkowski, Mission Hills, KS (US); Tracy Lee Nelson, Overland Park, KS (US); Stephen P. O'Neal, Overland Park, KS (US); William M. Parsel, Overland Park, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 164 days.

(21) Appl. No.: 16/361,681

(22) Filed: Mar. 22, 2019

(51) Int. Cl.
*G06F 11/14* (2006.01)
*H04W 24/04* (2009.01)
*G06F 9/4401* (2018.01)
*G06F 16/23* (2019.01)

(52) U.S. Cl.
CPC ........ *G06F 11/1417* (2013.01); *G06F 9/4416* (2013.01); *G06F 16/2379* (2019.01); *H04W 24/04* (2013.01)

(58) Field of Classification Search
CPC ............. G06F 11/1417; G06F 16/2379; G06F 9/4416; H04W 24/04
See application file for complete search history.

(56) References Cited

U.S. PATENT DOCUMENTS

| | | | |
|---|---|---|---|
| 9,560,078 B2 | 1/2017 | Sood et al. | |
| 9,667,427 B2 | 5/2017 | Oberhauser et al. | |
| 9,742,790 B2 | 8/2017 | Sood et al. | |
| 9,749,140 B2 | 8/2017 | Oberhauser et al. | |
| 10,033,595 B2 | 7/2018 | Sif et al. | |
| 10,361,843 B1* | 7/2019 | Suthar | H04L 9/3247 |
| 10,764,160 B1* | 9/2020 | Shtrauch | G06F 9/45558 |
| 2017/0250972 A1 | 8/2017 | Ronda et al. | |
| 2018/0089436 A1 | 3/2018 | Smith et al. | |
| 2018/0181759 A1 | 6/2018 | Smith et al. | |
| 2020/0225643 A1* | 7/2020 | Tugbo | G05B 19/4155 |

FOREIGN PATENT DOCUMENTS

| | | |
|---|---|---|
| WO | 2017218986 A1 | 12/2017 |
| WO | 2018126077 A1 | 7/2018 |

* cited by examiner

*Primary Examiner* — Matthew M Kim
*Assistant Examiner* — Matthew N Putaraksa

(57) ABSTRACT

A Network Function Virtualization Infrastructure (NFVI) executes Virtual Network Functions (VNFs) to transfer the VNF boot data to a distributed ledger. The distributed ledger performs a distributed ledger transaction with the VNF boot data to commit the VNF boot data to distributed ledger memory in a blockchain format. The NFVI executes the network VNF to deliver a network communication service. The NFVI loses VNF boot functionality and transfers a VNF boot request to the distributed ledger. The distributed ledger performs a distributed ledger transaction with the VNF boot request and the VNF boot data to transfer VNF recovery data to the NFVI and to commit the VNF boot request and the VNF recovery data to the distributed ledger memory in the blockchain format. The NFVI processes the VNF recovery data to recover the VNF boot functionality. The NFVI executes the recovered VNF to deliver the network communication service.

20 Claims, 6 Drawing Sheets

US 10,936,422 B1

RECOVERY OF VIRTUAL NETWORK FUNCTION (VNF) BOOT FUNCTIONALITY

TECHNICAL BACKGROUND

A wireless communication device like a phone has a memory that stores software and a processor that executes the software. The device memory also stores a boot file and the device processor that stores boot loader software. When the wireless communication device is powered-up, the device processor executes the boot loader software which reads the boot file from the device memory. Based on the boot file, the boot loader drives the device processor to retrieve and load other software like hardware drivers and operating systems. If the boot file becomes corrupted, then the boot loader will fail to properly load the software upon power-up. The utility of the wireless communication device is effectively lost when the device boot functionality is compromised.

The Radio Access Networks (RANs) that serve the wireless communication devices also have memories that stores boot files and processors that store boot loaders. When RAN circuitry is powered-up, the RAN processors execute the boot loaders to load software like hardware drivers and operating systems based on the boot files in the RAN memories. If one of the RAN boot files becomes corrupted, then the RAN boot loader will fail to properly load the software upon power-up. The utility of the RAN is effectively lost when the RAN boot functionality is compromised.

Wireless communication networks deploy Network Function Virtualization Infrastructures (NFVIs) that execute Virtual Network Functions (VNFs) to serve user communication devices. The NFVIs are computer systems with virtualization software. The VNFs are network elements like data routers, network controllers, and authorization databases. The VNFs have virtual machines with virtual processors and virtual memories. The virtual processors store virtual boot loaders, and the virtual memories store virtual boot files. When the virtual machines are virtually powered-up, their the virtual boot loader loads software like virtual hardware drivers and virtual operating systems based on the virtual boot file. If the virtual boot file becomes corrupted, then the virtual boot loader will fail to properly load the software upon virtual power-up. The utility of the VNF is effectively lost when the virtual boot functionality is compromised.

A distributed ledger comprises a computer network of distributed ledger nodes. The distributed ledger nodes each maintain a copy of ledger data in a blockchain database format. The blockchain database format stores a hash of the previous data block in the current data block. These hashes and a high number of geographically-diverse ledger nodes make the ledger data virtually immutable. The ledger nodes have endorser nodes that receive proposed ledger transactions. The endorser nodes process chain code to execute test transactions based on the proposals and may endorse test transactions per ledger endorsement rules. When a ledger transaction is endorsed, ledger orderer nodes distribute the endorsed ledger transaction to ledger peer nodes per orderer rules. The ledger peer nodes process the chain code to execute the endorsed ledger transaction. The ledger peer nodes may reach consensus on the executed ledger transaction, and when peer consensus is formed for the ledger transaction, the ledger peer nodes commit the ledger transaction to the immutable blockchain database and transfer chain code output.

Unfortunately, current data communication networks do not efficiently use distributed ledgers to effectively recover lost boot functionality. Moreover, current wireless communication networks do not efficiently use distributed ledgers to effectively recover lost virtual boot functionality.

TECHNICAL OVERVIEW

A Network Function Virtualization Infrastructure (NFVI) executes Virtual Network Functions (VNFs) to transfer VNF boot data to a distributed ledger. The distributed ledger performs a distributed ledger transaction with the VNF boot data to commit the VNF boot data to distributed ledger memory in a blockchain format. The NFVI executes the network VNF to deliver a network communication service. The NFVI loses VNF boot functionality and transfers a VNF boot request to the distributed ledger. The distributed ledger performs a distributed ledger transaction with the VNF boot request and the VNF boot data to transfer VNF recovery data to the NFVI and to commit the VNF boot request and the VNF recovery data to the distributed ledger memory in the blockchain format. The NFVI processes the VNF recovery data to recover the VNF boot functionality. The NFVI executes the recovered VNF to deliver the network communication service.

DETAILED DESCRIPTION

Figure 1:
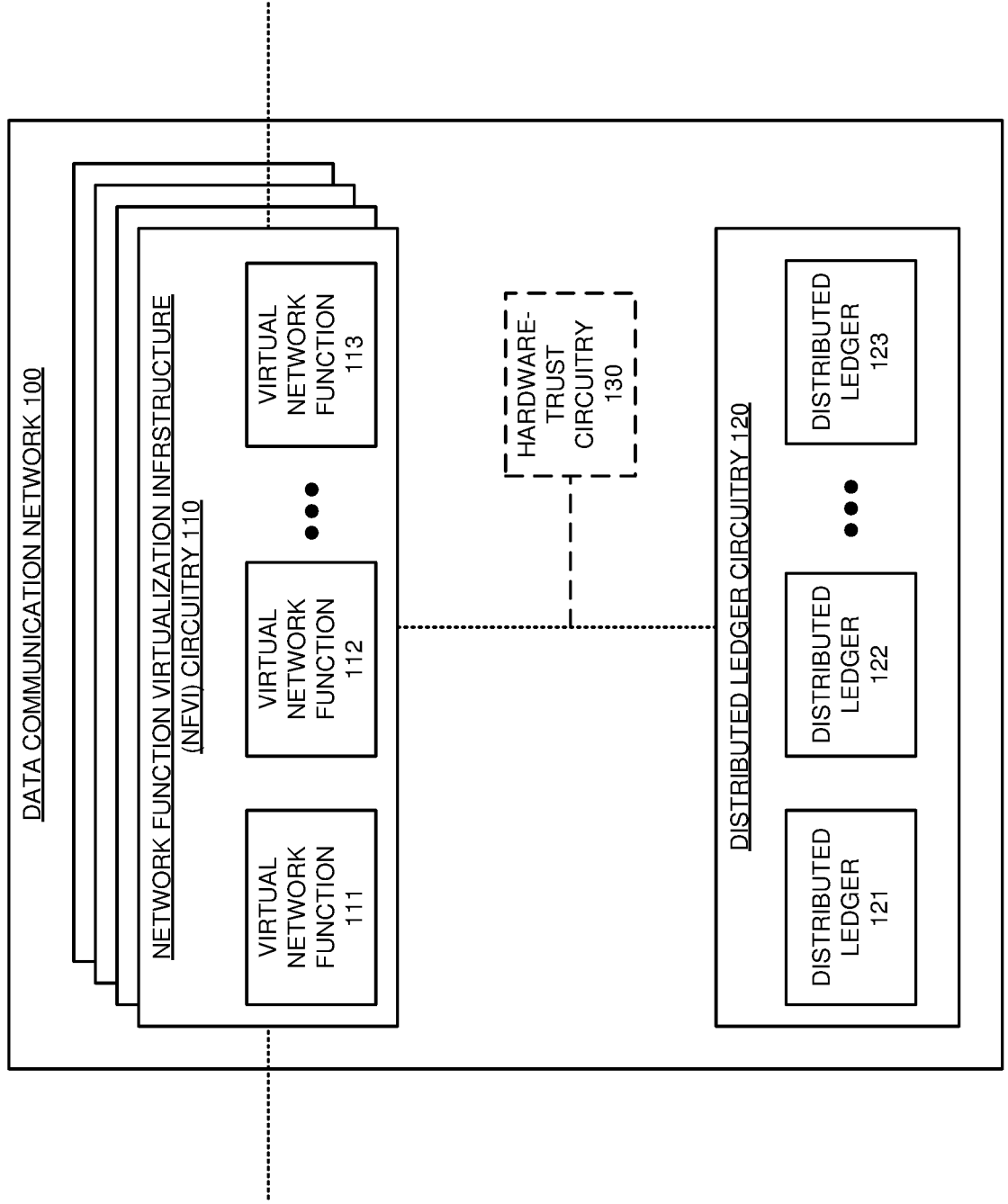
FIG. 1 illustrates a data communication network comprising distributed ledger circuitry that processes boot data for Virtual Network Functions (VNFs) to assist Network Function Virtualization Infrastructure (NFVI) circuitry when recovering VNF boot functionality.

FIG. 1 illustrates data communication network 100 comprising distributed ledger circuitry 120 that processes boot data for Virtual Network Functions (VNFs) 111-113 to assist Network Function Virtualization Infrastructure (NFVI) circuitry 110 when recovering VNF boot functionality. Data communication network 100 comprises NFVI circuitry 110 and distributed ledger circuitry 120. NFVI circuitry 110 comprises VNFs 111-113. Distributed ledger circuitry 120 comprises distributed ledgers 121-123. In some examples, data communication network 100 also comprises hardware-trust circuitry 130.

NFVI circuitry 110, distributed ledger circuitry 120, and possibly hardware-trust circuitry 130 are interconnected over data communication links. Exemplary data communication links comprise: Time Division Multiplex (TDM), Institute of Electrical and Electronic Engineers (IEEE) 802.3 (Ethernet), Internet Protocol (IP), Data Over Cable System Interface Specification (DOCSIS), Wave Division Multiplexing (WDM), IEEE 802.11 (WIFI), Fifth Generation New Radio (5 GNR), and Long Term Evolution (LTE).

NFVI circuitry 110 comprises computer hardware and software. The computer hardware comprises Central Processing Units (CPUs), Graphics Processing Units (GPUs), Application Specific Integrated Circuits (ASICs), Random Access Memory (RAM), flash drives, disc drives, Network Interface Cards (NICs), bus interfaces, transceivers, and/or the like. In the computer hardware, the memories store the software, the processing circuitry executes the software, and the Input/Output (I/O) communicate for the software. The software comprises boot loaders, boot files, hardware drivers, operating systems/hypervisors, NFV virtual switches, and VNFs 111-113.

VNFs 111-113 comprise virtual machines, operating systems, and network applications. Exemplary network VNFs comprise: User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), and Network Exposure Function (NEF).

Distributed ledger circuitry 120 comprises computer hardware and software. The computer hardware comprises CPUs, GPUs, ASICs, RAM, flash drives, disc drives, NICs, bus interfaces, transceivers, and/or the like. In the computer hardware, the memories store the software, the processing circuitry executes the software, and the I/O communicates for the software. The software comprises boot loaders, boot files, hardware drivers, operating systems, and distributed ledger applications. Exemplary distributed ledger applications include ledger clients, endorsers, orderers, peers, and the like. In some examples, distributed ledger circuitry 120 is integrated within NFVI circuitry 110 or some other NFVI circuitry Distributed ledgers 121-123 comprise geographically-diverse nodes of the computer hardware and software. Distributed ledgers 121-123 each maintain their own copy of the ledger data in a blockchain database format that comprises data blocks where the newest data block stores a hash of the previous data block. These hashes and a high number of geographically-diverse nodes make the ledger data virtually immutable. Distributed ledgers 121-123 include endorsers that receive proposed ledger transactions from ledger clients. The endorsers process chain code to execute test ledger transactions based on the proposals and may endorse test transactions per ledger endorsement rules. When a ledger transaction is endorsed, orderers distribute the endorsed ledger transaction to peers per orderer distribution rules. The peers process the chain code to execute the endorsed ledger transaction. When the peers reach consensus on the executed ledger transaction, the peers commit the ledger transaction to their immutable blockchain database and transfer chain code output to the ledger clients.

NFVI circuitry 110 executes VNFs 111-113 that drive circuitry 110 to transfer VNF boot data to distributed ledger circuitry 120. The VNF boot data comprises VNF boot loader identifiers, VNF boot file identifiers, and the like. Distributed ledger circuitry 120 executes a distributed ledger application which drives circuitry 120 to perform a distributed ledger transaction with the VNF boot data and to commit the VNF boot data to distributed ledger memory in the blockchain format.

NFVI circuitry 120 executes VNFs 111-113 that drive circuitry 120 to deliver a network communication service. Exemplary network communication services comprise data messaging, mobile networking, and the like. When executing VNFs 111-113, NFVI circuitry 120 loses VNF boot functionality for VNF 111. The loss of VNF boot functionality comprises a failure to complete the virtual boot loading process due to a corrupt virtual boot file or virtual boot loader. In response, NFVI circuitry 120 transfers a VNF boot request for VNF 111 to distributed ledger circuitry 120. In some examples, the virtual boot loader in VNF 111 generates and transfers the VNF boot request for VNF 111. In other examples, a virtual switch, hypervisor, orchestrator, or VNF manager in NFVI circuitry generates and transfers the VNF boot request for VNF 111.

Distributed ledger circuitry 120 executes a distributed ledger application that drives circuitry 120 to perform another distributed ledger transaction with the VNF boot request and the VNF boot data. The distributed ledger application drives distributed ledger circuitry 120 to transfer VNF recovery data to NFVI circuitry 110 and to commit the VNF boot request and the VNF recovery data to the distributed ledger memory in the blockchain format. NFVI circuitry 110 processes the VNF recovery data to recover the VNF boot functionality. For example, the VNF boot request may include a boot loader version and boot file version, and the VNF recovery data may include a new virtual boot file and/or boot loader update. NFVI circuitry 110 executes recovered VNF 111 which drives NFVI circuitry 110 to deliver the network communication service. Distributed-ledger circuitry 120 may also implement side distributed ledgers in response to executing the distributed ledger transactions with the boot data.

In some examples, hardware-trust circuitry 130 establishes hardware trust with VNFs 111-113 and distributed ledgers 121-123. To establish hardware-trust, hardware-trust circuitry 130 transfers random numbers to VNFs 111-113 and distributed ledgers 121-123. VNFs 111-113 and distributed ledgers 121-123 hash the random numbers with their physically-embedded, read-only, hardware-trust codes to generate hardware-trust results. VNFs 111-113 and distributed ledgers 121-123 transfer the hardware-trust results to hardware-trust circuitry 130. Hardware-trust circuitry 130 hashes the random numbers with its own copy of the hardware-trust codes to generate the same hardware-trust results. Hardware-trust is established when results match. The process may be repeated or performed on demand to maintain hardware-trust. Hardware-trust circuitry 130 transfers hardware-trust digital certificates to VNFs 111-113 and distributed ledgers 121-123 when their hardware-trust is established. VNFs 111-113 and distributed ledgers 121-123 exchange their hardware-trust digital certificates and verify hardware-trust by decrypting the hardware-trust digital certificates with a public key for hardware-trust circuitry 120. VNFs 111-113 and distributed ledgers 121-123 will not interact if the other fails hardware-trust.

Advantageously, data communication network 100 efficiently and effectively uses distributed ledgers 121-123 to recover lost VNF boot functionality.

Figure 2:
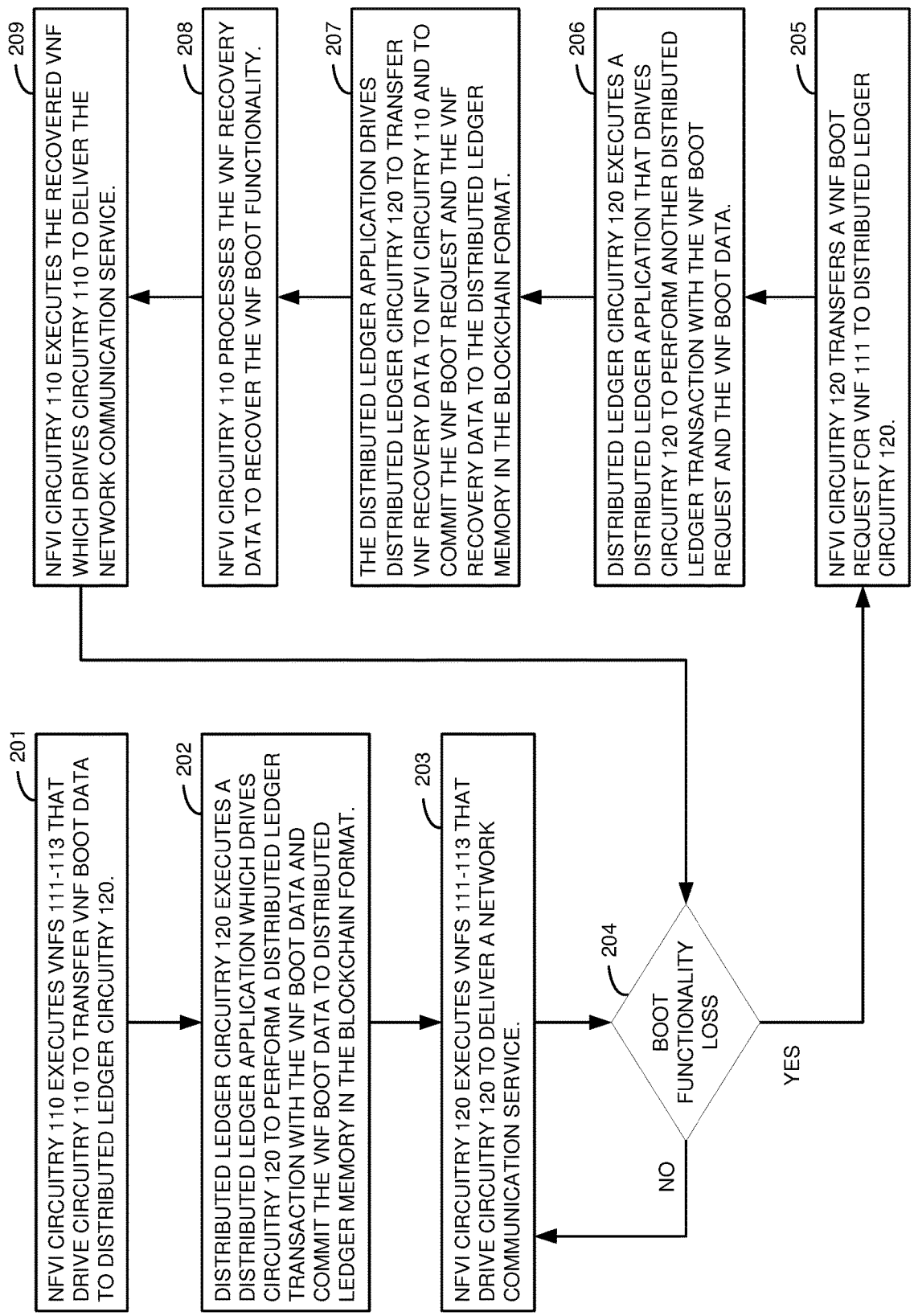
FIG. 2 illustrates the operation of the data communication network comprising the distributed ledger circuitry that processes the boot data for VNFs to assist NFVI circuitry when recovering VNF boot functionality.

FIG. 2 illustrates the operation of data communication network 100 comprising distributed ledger circuitry 120 that processes the boot data for VNFs 111-113 to assist NFVI circuitry 110 when recovering VNF boot functionality. NFVI circuitry 110 executes VNFs 111-113 that drive circuitry 110 to transfer VNF boot data to distributed ledger circuitry 120 (201). Distributed ledger circuitry 120 executes a distributed ledger application which drives circuitry 120 to perform a distributed ledger transaction with the VNF boot data and commit the VNF boot data to distributed ledger memory in the blockchain format (202). NFVI circuitry 120 executes VNFs 111-113 that drive circuitry 120 to deliver a network communication service (203). When executing VNFs 111-113, NFVI circuitry 120 may detect a loss of VNF boot functionality for one of VNFs 111-113 (204). In response, NFVI circuitry 120 transfers a VNF boot request for that VNF to distributed ledger circuitry 120 (205).

Distributed ledger circuitry 120 executes a distributed ledger application that drives circuitry 120 to perform another distributed ledger transaction with the VNF boot request and the VNF boot data (206). The distributed ledger application drives distributed ledger circuitry 120 to transfer VNF recovery data to NFVI circuitry 110 and to commit the VNF boot request and the VNF recovery data to the distributed ledger memory in the blockchain format (207). NFVI circuitry 110 processes the VNF recovery data to recover the VNF boot functionality (208). NFVI circuitry 110 executes the recovered VNF which drives circuitry 110 to deliver the network communication service (209).

Figure 3:
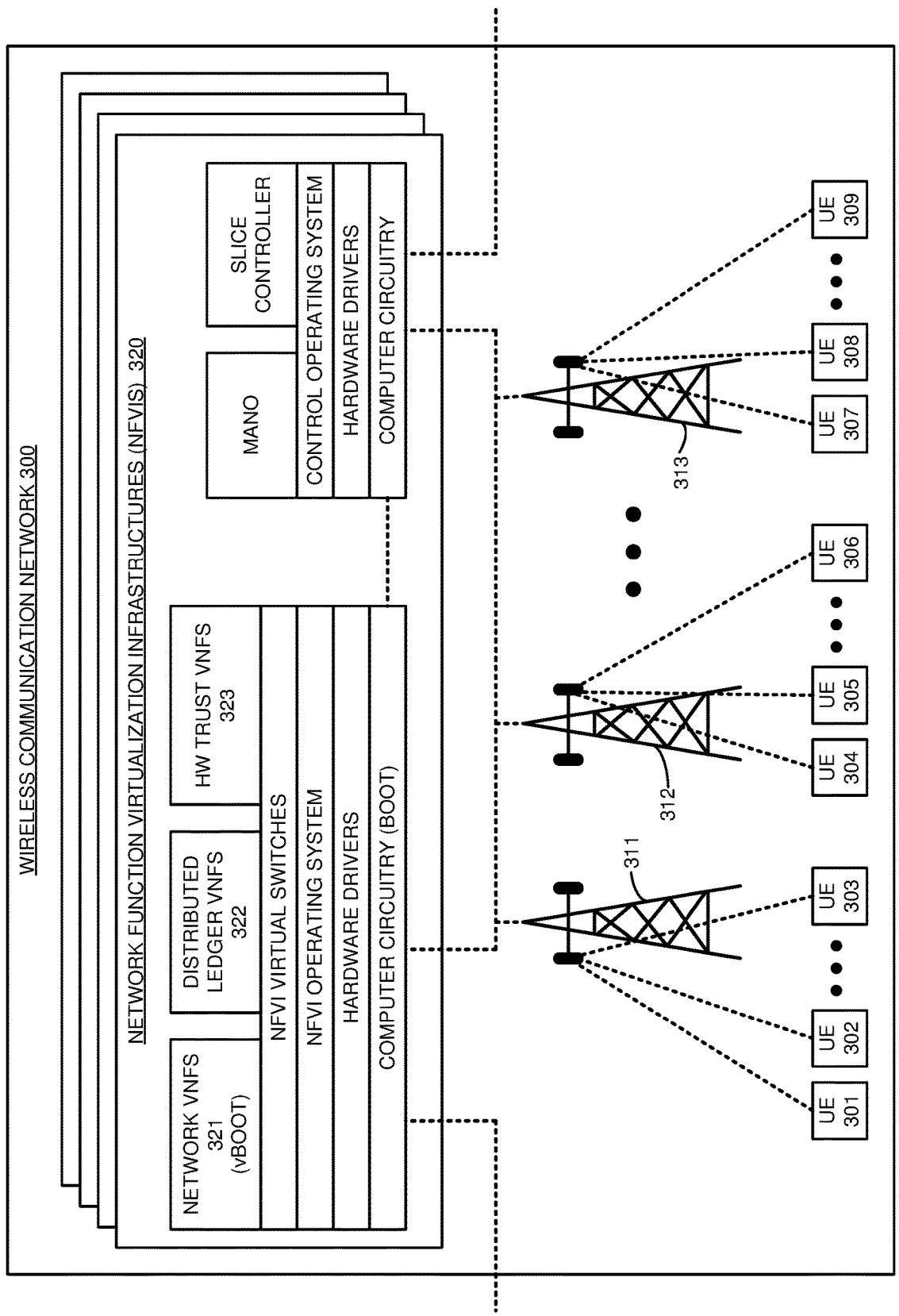
FIG. 3 illustrates a wireless communication network comprising distributed ledger VNFs that process boot data for VNFs, UEs, and RANs to assist the NFVIs, UEs, and RANs when recovering VNF, UE, and RAN boot functionality.

FIG. 3 illustrates wireless communication network 300 comprising distributed ledger Virtual Network Functions (VNFs) 322 that process boot data for network VNFs 321, User Equipment (UEs) 301-309, and Radio Access Networks (RANs) 311-313 to assist NFVIs 320, UEs 301-309, and RANs 311-309 when recovering network VNF, UE, and RAN boot functionality. Wireless communication network 300 is an example of data communication system 100 although communication system 100 could differ. Wireless communication network 300 comprises UEs 301-309, RANs 311-313, and NFVIs 320. NFVIs 320 each comprise computer circuitry and software. The computer circuitry comprises a boot loader and boot file (BOOT). The software comprises hardware drivers, operating systems, virtual switches, slice controller, Management and Orchestration (MANO), network VNFs 321, ledger VNFs 322, and hardware-trust VNFs 323. Network VNFs 321 comprise virtual computer circuitry that has a virtual boot loader and virtual boot file (vBOOT).

UEs 301-309 and hardware-trust VNFs 323 communicate over RANs 311-313, NFVIs 320, and network VNFs 321. UEs 301-309 and distributed ledger VNFs 322 communicate over RANs 311-313, NFVIs 320, and network VNFs 321. RANs 311-313 and hardware-trust VNFs 323 communicate over NFVIs 320 and network VNFs 321. RANs 311-313 and distributed ledger VNFs 322 communicate over NFVIs 320 and network VNFs 321. Network VNFs 321 and hardware-trust VNFs 323 communicate over NFVIs 320. Network VNFs 321 and distributed ledger VNFs 322 communicate over NFVIs 320.

UEs 301-309 could be computers, phones, vehicles, robots, sensors, controllers, and/or the like. UEs 301-309 comprise radio circuitry and control circuitry. The radio circuitry comprises antennas, modulators, amplifiers, filters, digital/analog interfaces, processing circuitry, memory circuitry, firmware/software, and bus circuitry. The control circuitry comprises processing circuitry, memory circuitry, bus circuitry, and software. Software is stored in the memory circuitry and includes a boot file, hardware-trust module, operating system, ledger client application, network applications, and user applications. The boot file indicates a boot loader version identifier and a boot file version identifier. Software is also stored in the processing circuitry and includes a boot loader. In UEs 301-309, the processing circuitry retrieves and executes the software to perform boot loading, hardware-trust, boot recovery, and user tasks as described herein. UEs 301-309 include hardware-trust codes that are physically embedded in their read-only memory circuitry.

RANs 311-313 comprise wireless access points and backhaul circuitry. The wireless access points use wireless communication protocols like Fifth Generation New Radio (5 GNR), Institute of Electrical and Electronic Engineers (IEEE) 802.11 (WIFI), and Long Term Evolution (LTE). The backhaul circuitry may use the wireless communication protocols and/or wireline communication protocols like IEEE 802.3 (Ethernet), Time Division Multiplex (TDM), Internet Protocol (IP), Data Over Cable System Interface Specification (DOCSIS), Wave Division Multiplexing (WDM). The wireless access points comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. Software is stored in the memory circuitry and includes a boot file, hardware-trust module, operating system, ledger client application, and network applications. The boot file indicates a boot loader version identifier and a boot file version identifier. Software is also stored in the processing circuitry and includes a boot loader. In RANs 311-313, the processing circuitry retrieves and executes the software to perform boot loading, hardware-trust, boot recovery, and network tasks as described herein. RANs 311-313 include hardware-trust codes that are physically embedded in their read-only memory circuitry.

NFVIs 320 comprise computer circuitry and software. The computer circuitry comprises processing circuitry like Central Processing Units (CPUs), Graphics Processing Units (GPUs), and/or Application Specific Integrated Circuits (ASICs). The computer circuitry comprises memory circuitry like Random Access Memory (RAM), flash drives, and/or disc drives. The computer circuitry comprises transceiver circuitry like Network Interface Cards (NICs), bus interfaces, I/O ports, and/or the like. The computer circuitry includes bus circuitry to interconnect the processing circuitry, memory circuitry, and transceiver circuitry. Software is stored in the memory circuitry and includes a boot file, hardware-trust module, hardware drivers, operating systems, virtual switches, VNFs 321-323, MANO, and slice controller. The boot file indicates a boot loader version identifier and a boot file version identifier. Software is also stored in the processing circuitry and includes a boot loader. In NFVIs 320, the processing circuitry executes the software to perform boot loading, hardware-trust, boot recovery, and network tasks as described herein. NFVIs 320 include hardware-trust codes that are physically embedded in their read-only memory circuitry.

The boot loader executes upon power-up and processes the boot file. In response to the boot file, the boot loader loads the hardware drivers, operating systems, hardware-trust module, MANO, and slice controller into the processing circuitry for execution. The hardware drivers communicate with hardware components like CPUs, RAM, flash dives, bus interfaces, NICs, and the like. The operating systems communicate with the hardware drivers. The NFVI operating system includes hypervisors, NFV control agents, and the like. The NFVI virtual switches couple VNFs 321-322 to one another and to the NFVI operating system. The slice controller directs the creation, modification, and termination of network slices by signaling the MANO, RANs 311-313, and UEs 301-309. The MANO includes an orchestrator, Virtual Infrastructure Manager (VIM), and VNF Manager (VNFM) to control the execution of VNFs 321-323 in NFVIs 320. Hardware-trust VNFs 323 establish and maintain hardware-trust. Distributed ledger VNFs 322 endorse boot transactions, execute boot transactions, store boot data in immutable block chains, and transfer boot recovery data. Network VNFs 321 exchange boot data, requests, and recovery data between distributed ledger VNFs 323, RANs 311-313, and UEs 301-309.

Network VNFs 321 execute their virtual boot loaders upon virtual power-up and process their virtual boot files. In response to the virtual boot files, the virtual boot loaders load virtual hardware drivers, virtual operating systems, virtual hardware-trust modules, and other VNF components into the virtual processing circuitry for execution. Network VNFs 321 comprise: User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (S-GW), Packet Data Network Gateway (P-GW), Policy Control Rules Function (PCRF), and typically other network functions.

The UPF routes data packets and forms an anchor point for user mobility. The UPF inspects packets and applies Quality-of-Service (QoS) and policies. The AMF terminates N2 signaling and N1 mobility signaling. The AMF manages ciphering, security, authentication, registration, connections, mobility, and policy enforcement. The SMF terminates N1 session signaling and manages session establishment, modification, and release. The SMF allocates network addresses, controls RAN QoS and policies, handles downlink notifications, UPF control, and traffic steering. The AUSF serves user authentication through the UDM. The UDM generates user authentication credentials, identifies users, authorizes access, and manages user subscriptions. The PCF provides policy rules for network slices, roamers, and mobility. The AF routes traffic and implements policy controls. The NRF handles network function discovery and controls function profiles and instances. The NSSF selects network slices, assistance information, and AMFs for users. The NEF exposes capabilities and events and securely interacts with external applications to provision network functions.

In NFVIs 320, the slice controller directs the MANO to launch a wireless network slice based on NFVI Service Descriptors (SDs) and Forwarding Graphs (FGs). The wireless network slice comprises network VNFs 321, distributed ledger VNFs 322, and hardware trust VNFs 323. The MANO directs the NFVI operating system to execute VNFs 321-323 and the virtual switches per the NFVI SDs and FGs. The NFVI operating systems execute VNFs 321-323 and the NFVI virtual switches per the NFVI SDs and FGs. The slice controllers direct the NEFs or some other function to provision UEs 301-309 and RANs 311-313 for the boot recovery. For example, the NEFs may download boot loaders, boot files, hardware-trust modules, and ledger clients to UEs 301-309 and RANs 311-313.

Hardware-trust VNFs 323 establish hardware-trust with UEs 301-309, RANs 311-313, network VNFs 321, and distributed ledger VNFs 322. Hardware-trust VNFs 323 transfer random numbers to UEs 301-309, RANS 311-313, and VNFs 321-322. UEs 301-309, RANs 311-313, and VNFs 321-322 hash the random numbers with their read-only hardware-trust codes to transfers the hardware-trust results to hardware-trust VNFs 323. Hardware-trust VNFs 323 hash the random numbers with copies of the read-only hardware-trust codes to generate the hardware-trust results. Hardware-trust VNFs 323 establish hardware-trust when the results match. The hardware-trust process is repeated or performed on demand to maintain hardware-trust. Hardware-trust VNFs 323 transfer hardware-trust digital certificates to UEs 301-309, RANs 311-313, and VNFs 321-322 when hardware-trust is established. UEs 301-309, RANs 311-313, and VNFs 321-322 share their hardware-trust digital certificates and verify hardware-trust by decrypting the digital certificates with a public key from hardware-trusts VNFs 323. UEs 301-309, RANs 311-313, and VNFs 321-322 are configured to stop interactions with an entity that fails hardware-trust.

Network VNFs 321 deliver a network communication service. Network VNFs 321 also transfer their VNF boot data (virtual boot loader, virtual boot file, and/or version numbers) to distributed ledger VNFs 322. Distributed ledger VNFs 322 perform distributed ledger transactions with the VNF boot data and commit the VNF boot data to distributed ledger memory in the blockchain format. The loss of virtual VNF boot functionality comprises a failure to complete the virtual boot loading process due to a corrupt virtual boot file or virtual boot loader in the network VNF. When one of network VNFs 321 loses virtual VNF boot functionality, the virtual boot loader, virtual switch, NFVI operating system, and/or MANO detect the loss and transfer a VNF boot request for the network VNF to distributed ledger VNFs 323.

Distributed ledger VNFs 323 perform a distributed ledger transaction with the VNF boot request and the VNF boot data for the failed network VNF. Distributed ledger VNFs 323 transfer VNF recovery data to the virtual boot loader, NFVI operating system, virtual switch, and/or MANO. Distributed ledger VNFs 323 commit the VNF boot request and the VNF recovery data to the distributed ledger memory in the blockchain format. The virtual boot loader, NFVI operating system, virtual switch, and/or MANO process the VNF recovery data to recover the VNF boot functionality. For example, the VNF boot request may include a virtual boot loader version and virtual boot file version, and the VNF recovery data may include a new virtual boot file and/or virtual boot loader update. The recovered network VNF delivers the network communication service.

UEs 301-309 receive the network communication service. UEs 301-309 also transfer their UE boot data (boot loader, boot file, and/or version numbers) to distributed ledger VNFs 322. Distributed ledger VNFs 322 perform distributed ledger transactions with the VNF boot data and commit the VNF boot data to distributed ledger memory in the blockchain format. The loss of UE boot functionality comprises a failure to complete the boot loading process due to a corrupt UE boot file or UE boot loader. When one of UEs 301-309 loses UE boot functionality, the UE boot loader detects the loss and transfers a UE boot request to distributed ledger VNFs 323.

Distributed ledger VNFs 323 perform a distributed ledger transaction with the UE boot request and the UE boot data. Distributed ledger VNFs 323 transfer UE recovery data to the UE boot loader. Distributed ledger VNFs 323 commit the UE boot request and the UE recovery data to the distributed ledger memory in the blockchain format. The UE boot loader processes the UE recovery data to recover the UE boot functionality. For example, the UE boot request may include a UE boot loader version and boot file version, and the UE recovery data may include a new UE boot file and/or UE boot loader update. The recovered UE again receives the network communication service.

RANs 311-313 support the network communication service. RANs 311-313 also transfer their RAN boot data (boot loader, boot file, and/or version numbers) to distributed ledger VNFs 322. Distributed ledger VNFs 322 perform distributed ledger transactions with the RAN boot data and commit the RAN boot data to distributed ledger memory in the blockchain format. The loss of RAN boot functionality comprises a failure to complete the boot loading process due to a corrupt RAN boot file or RAN boot loader. When one of RANs 311-313 loses RAN boot functionality, the RAN boot loader detects the loss and transfers a RAN boot request to distributed ledger VNFs 323.

Distributed ledger VNFs 323 perform a distributed ledger transaction with the RAN boot request and the RAN boot data. Distributed ledger VNFs 323 transfer RAN recovery data to the RAN boot loader. Distributed ledger VNFs 323 commit the RAN boot request and the RAN recovery data to the distributed ledger memory in the blockchain format. The RAN boot loader processes the RAN recovery data to recover the RAN boot functionality. For example, the RAN boot request may indicate a RAN boot file version number and the RAN recovery data may comprise a new RAN boot file for that version number. The recovered RAN again supports the network communication service.

Figure 4:
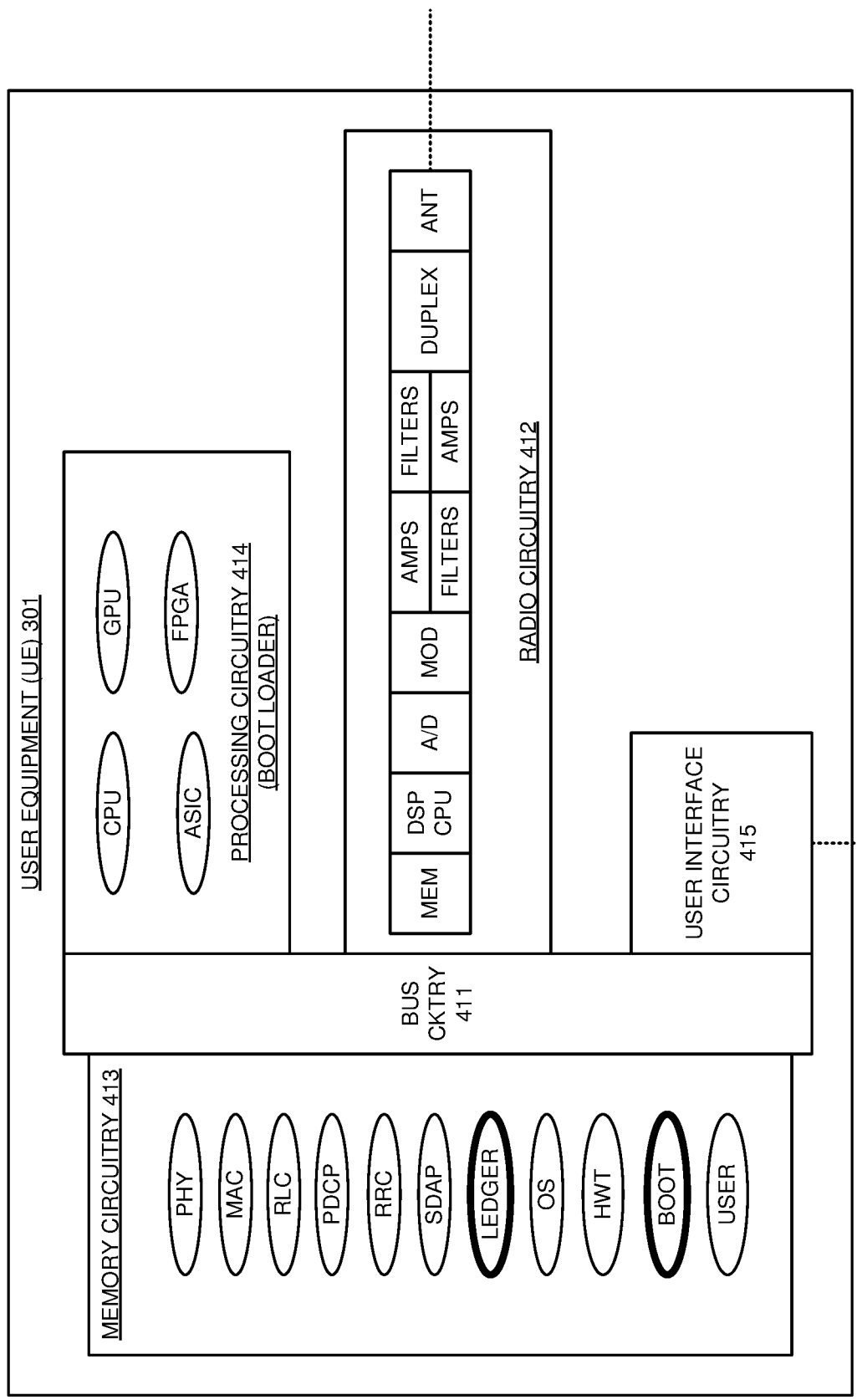
FIG. 4 illustrates a wireless User Equipment (UE) in the wireless communication network comprising distributed ledger VNFs that process boot data for UEs to assist the UEs when recovering UE boot functionality.

FIG. 4 illustrates wireless User Equipment (UE) 301 in wireless communication network 300 that has distributed ledger VNFs 321 to process boot data for UEs 301-309 and assist UEs 301-309 when recovering UE boot functionality. UE 301 is an example of UEs 302-309, although UEs 302-309 may differ. UE 301 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like RAM, flash, disc, tape, and the like. Memory circuitry 413 stores a boot file (BOOT), operating system (OS), network applications, hardware-trust module (HWT), and distributed ledger client (LEDGER). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP).

Processing circuitry 414 comprises CPUs, GPUs, ASICs, Field Programmable Gate Arrays (FPGAs), and/or some other computer hardware. Processing circuitry 414 stores a boot loader and a read-only hardware-trust code. Processing circuitry 414 executes the boot loader, boot file, hardware-trust module, operating system, network applications, and distributed ledger client to perform boot loading, hardware-trust, boot recovery, and user tasks as described herein. The boot loader executes upon power-up and processes the boot file. In response to the boot file, the boot loader loads hardware drivers, hardware-trust module, operating systems, and network applications in processing circuitry 414 for execution.

Radio circuitry 412 comprises antennas (ANT), duplexers (DUPLEX), filters, amplifiers (AMPS), modulators (MOD), Analog/Digital interfaces (A/D), Digital Signal Processors (DSP), CPUs, and memory (MEM). The antennas in radio circuitry 412 exchange wireless signals with RANs 311-313. The DSP/CPUs execute radio firmware/software to drive the exchange of corresponding data signals between the antennas and memory circuitry 413. Processing circuitry 414 executes the networking applications to drive the exchange of corresponding data between the memory circuitry 413 and UE software.

UE software in processing circuitry 414 transfers Uplink (UL) data to RANs 311-313 over radio circuitry 412. In radio circuitry 412, the DSP/CPU transfers corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to RANs 311-313.

In radio circuitry 412, the antennas receive wireless Downlink (DL) signals from RANs 311-313 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPU. The DSP/CPU recovers DL data from the DL signals and transfers the DL data to memory circuitry 413. The network applications process the DL data in memory circuitry 413 and transfer DL data to UE software.

In the network applications, the PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and QoS. The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC interacts with wireless network controllers like Access and Mobility Functions (AMFs) and/or Mobility Management Entities (MMEs) to establish and terminate data sessions. The RRC supports N1 and Non-Access Stratum (NAS) messaging with the MMEs/AMFs. The RRC handles network attachment, security and key management, handover operations, status reporting, QoS, system broadcasts, and network pages. The SDAP exchanges S3 data with UPFs under the control of SMFs. The SDAP maps between the SDUs and the QoS flows and marks the QoS flows with the proper QoS.

When UE 301 powers-up, the boot loader loads software based on the boot file. The hardware trust module establishes hardware-trust with hardware-trust VNFs 323. To establish hardware-trust, the hardware trust module hashes random numbers from hardware-trust VNFs 323 with the read-only hardware-trust code in processing circuitry 414 to transfer hardware-trust results to hardware-trust VNFs 323. The hardware trust module receives hardware-trust digital certificates from hardware-trust VNFs 323 when hardware-trust is established. The boot loader stores loading data for the hardware-trust module, operating system, distributed ledger client, and network applications. The boot loader transfers its version ID, hardware-trust digital certificate, and the boot file to distributed ledger VNFs 322 over the operating system, network applications, and radio circuitry 412.

In processing circuitry 414, the boot loader subsequently detects a loss of boot functionality by its failure to complete a boot loading process. In response, the boot loader transfers a UE boot request to distributed ledger VNFs 323. To transfer the boot request, the boot loader loads (if not loaded) the hardware-trust module, operating system, distributed ledger client, and network applications using its stored loading data. The boot loader obtains the recent hardware-trust digital certificate from the hardware-trust module and transfers the boot request to the distributed ledger client. The distributed ledger client transfers the boot request to the network applications which transfer the boot request to distributed ledger VNFs 322 over radio circuitry 412. The boot request carries a UE 301 ID, boot file version ID, network address for VNFs 322, and the hardware-trust digital certificate.

The network applications receive boot recovery data from distributed ledger VNFs 322 over radio circuitry 412. The network applications transfer the boot recovery data to the distributed ledger client. The distributed ledger client transfers the digital certificate from the boot recovery data to the hardware trust module for hardware-trust validation. The distributed ledger client transfers the boot recovery data to the boot loader. The boot loader processes the boot recovery data to recover the boot functionality. For example, the boot recovery data may include a new boot file to replace a corrupt boot file.

Figure 5:
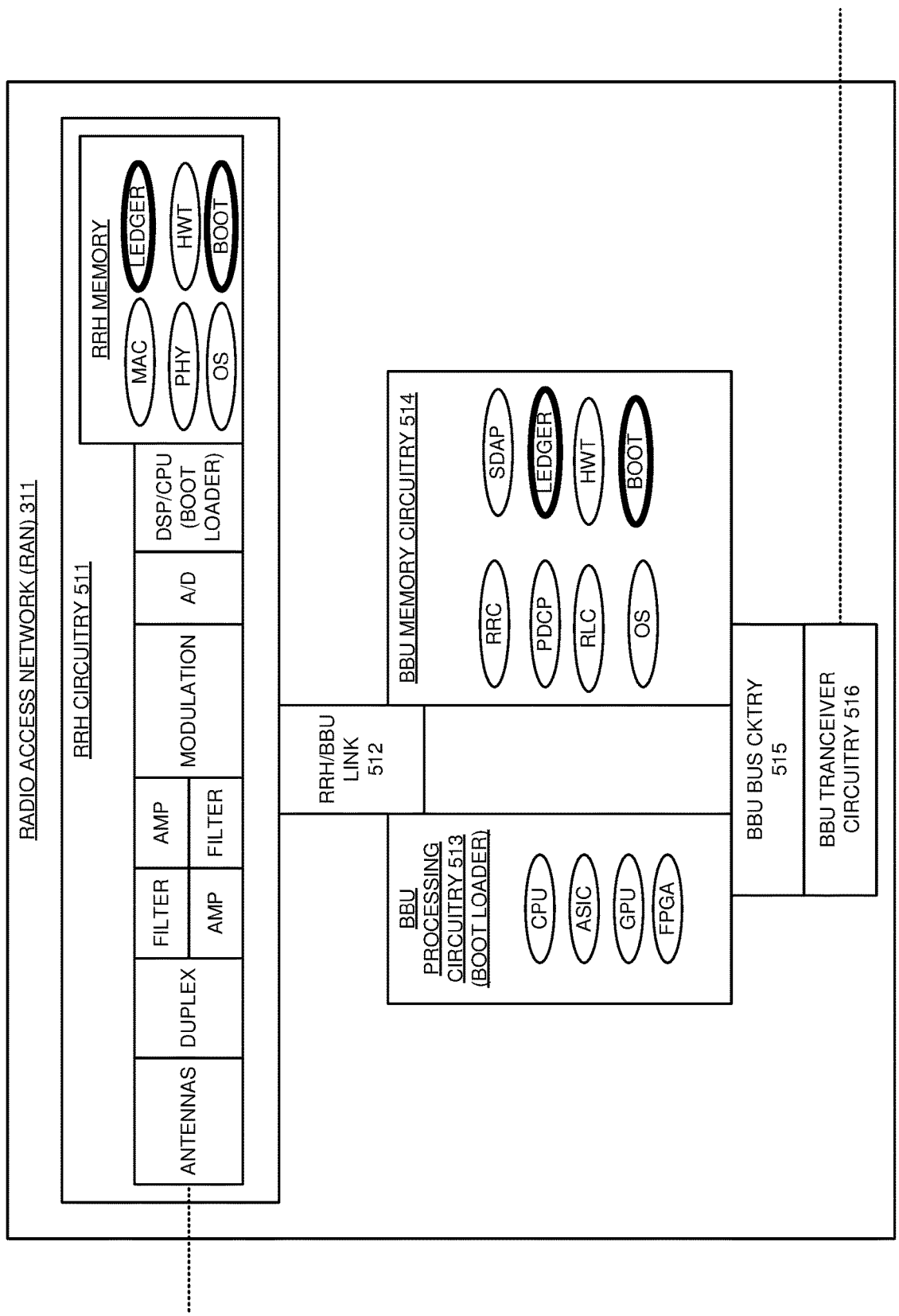
FIG. 5 illustrates a Radio Access Network (RAN) in the wireless communication network comprising distributed ledger VNFs that process boot data for RANs to assist the RANs circuitry when recovering RAN boot functionality.

FIG. 5 illustrates Radio Access Network (RAN) 311 in wireless communication network 300 that has distributed ledger VNFs 322 to process boot data for RANs 311-313 to assist RANs 311-313 when recovering RAN boot functionality. RAN 311 is an example of RANs 312-313, although these RANS 311-312 may differ. RAN 311 comprises Remote Radio Head (RRH) circuitry 511, RRH/Baseband Unit (BBU) link 512, BBU processing circuitry 513, BBU memory circuitry 514, BBU bus circuitry 516, and BBU transceiver circuitry 515. RRH/BBU link 512 couples RRH circuitry 511 and BBU circuitry 513-514. BBU bus circuitry 515 couples BBU processing circuitry 513, BBU memory circuitry 514, and BBU transceiver circuitry 516.

BBU processing circuitry 513 comprises CPUs, GPUs, ASICs, FPGAs, and/or some other computer circuitry. BBU processing circuitry 513 stores a boot loader and a read-only hardware-trust code. BBU memory circuitry 514 comprises volatile and non-volatile memories like RAM, flash, disc, tape, and the like. BBU memory circuitry 514 stores a boot file (BOOT), operating system (OS), network applications (RLC, PDCP, RRC, SDAP), hardware-trust module (HWT), and distributed ledger client (LEDGER). BBU processing circuitry 513 executes the boot loader, boot file, hardware-trust module, operating system, network applications, and distributed ledger client to perform boot loading, hardware-trust, boot recovery, and network tasks as described herein. The boot loader executes upon power-up and processes the boot file. In response to the boot file, the boot loader loads the hardware drivers, hardware-trust module, operating systems, and network applications in BBU processing circuitry 513 for execution.

RRH circuitry 511 comprises antennas, duplexers, filters, amplifiers, modulators, A/D interfaces, DSP/CPU, and memory. The RRH memory stores a boot file, hardware-trust module, operating system, network applications (PHY, MAC), and distributed ledger client. The RRH DSP/CPUs store a boot loader. The RRH DSP/CPUs execute the boot loader, boot file, hardware-trust module, operating system, network applications, and distributed ledger client to perform boot loading, hardware-trust, boot recovery, and network tasks as described herein. The boot loader executes upon power-up and processes the boot file. In response to the boot file, the boot loader loads hardware drivers, hardware-trust module, operating systems, and network applications for execution in the DSP/CPU of RRH circuitry 511.

In RRH circuitry 511, the antennas receive wireless UL signals from UEs 301-309 and transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for the DSP/CPU. The DSP/CPU recovers UL data from the UL signals. The RRH DSP/CPU transfers the UL data to BBU memory circuitry 514. In BBU processing circuitry 513, the network applications (RLC, PDCP, RRC, SDAP) process and forward the UL data to NFVIs 320 over BBU circuitry 515-516.

BBU transceiver circuitry 515 receives DL data and stores the DL data in BBU memory circuitry 514. The network applications (RLC, PDCP, RRC, SDAP) process and forward the DL data from BBU memory circuitry 514 to RRH circuitry 511. In RRH circuitry 511, the DSP/CPU executes the network applications (PHY, MAC) to transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to UEs 301-309.

In the network applications, the PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

The MAC maps between the MAC transport channels and MAC logical channels. MAC functions include buffer status, power headroom, channel quality, HARQ, user identification, random access, user scheduling, and QoS. The RLC maps between the MAC logical channels and PDUs. RLC functions comprise ARQ, sequence numbering and resequencing, segmentation and resegmentation. The RLC exchanges data and signaling with the PDCP. The PDCP maps between the PDUs from the RLC and SDUs for the RRC/SDAP. PDCP functions comprise security ciphering, header compression and decompression, sequence numbering and re-sequencing, de-duplication. The PDCP exchange SDUs with the RRC and SDAP.

The RRC interacts with wireless network controllers like AMFs to establish and terminate data sessions. The RRC supports N1 and NAS messaging with the MMEs/AMFs. The RRC handles network attachment, security and key management, handover operations, status reporting, QoS, system broadcasts, and network pages. The SDAP exchanges S3 data with UPFs under the control of SMFs. The SDAP maps between the SDUs and the QoS flows and marks the QoS flows with the proper QoS.

When BBU processing circuitry 513-516 powers-up, the boot loader loads software based on the boot file. The boot loader stores loading data for the hardware-trust module, operating system, and distributed ledger client. The hardware trust module establishes hardware-trust with hardware-trust VNFs 323. To establish hardware-trust, the hardware trust module hashes random numbers from hardware-trust VNFs 323 with the read-only hardware-trust code in BBU processing circuitry 513 to transfer hardware-trust results to hardware-trust VNFs 323. The hardware trust module receives hardware-trust digital certificates from hardware-trust VNFs 323 when hardware-trust is established. The boot loader transfers its version ID, boot file, and hardware-trust digital certificate to distributed ledger VNFs 322 over the operating system, distributed ledger client, and BBU circuitry 515-516.

When RRH circuitry 511 powers-up, the boot loader in the DSP/CPU loads software based on the boot file. The boot loader stores loading data for the hardware-trust module, operating system, and distributed ledger client in RRH circuitry 511. The hardware trust module establishes hardware-trust with hardware-trust VNFs 323. To establish hardware-trust, the hardware trust module hashes random numbers from hardware-trust VNFs 323 with the read-only hardware-trust code in RRH circuitry 511 to transfer hardware-trust results to hardware-trust VNFs 323. The hardware trust module receives hardware-trust digital certificates from hardware-trust VNFs 323 when hardware-trust is established. The boot loader transfers its version ID, boot file, and hardware-trust digital certificate to distributed ledger VNFs 322 over the operating system, distributed ledger client, and BBU circuitry 513-516.

In RRH circuitry 511, the boot loader in the CPU subsequently detects a loss of boot functionality by its failure to complete a boot loading process. In response, the boot loader transfers an RRH boot request to distributed ledger VNFs 323. To transfer the boot request, the boot loader loads (if not loaded) the hardware-trust module, operating system, and distributed ledger client using its stored loading data. The boot loader obtains the recent hardware-trust digital certificate from the hardware-trust module and transfers the boot request to the distributed ledger client. The distributed ledger client transfers the boot request to distributed ledger VNFs 322 over BBU circuitry 515-516. The boot request carries a RAN 311 ID, boot file version ID, network address for VNFs 322, and hardware-trust digital certificate.

In RRH circuitry 511, the distributed ledger client receives boot recovery data from distributed ledger VNFs 322 over BBU circuitry 515-515. The distributed ledger client transfers the digital certificate from the boot recovery data to the hardware trust module for hardware-trust validation. The distributed ledger client transfers the boot recovery data to the boot loader. In RRH circuitry 511, the boot loader processes the boot recovery data to recover the boot functionality. For example, the boot recovery data may include a new boot file to replace a corrupt boot file.

In BBU processing circuitry 513, the boot loader subsequently detects a loss of boot functionality by its failure to complete a boot loading process. In response, the boot loader transfers a BBU boot request to distributed ledger VNFs 323. To transfer the boot request, the boot loader loads (if not loaded) the hardware-trust module, operating system, and distributed ledger client using its stored loading data. The boot loader obtains the recent hardware-trust digital certificate from the hardware-trust module and transfers the boot request to the distributed ledger client. The distributed ledger client transfers the boot request to distributed ledger VNFs 322 over BBU circuitry 515-516. The boot request carries a RAN 311 ID, boot file version ID, network address for VNFs 322, and hardware-trust digital certificate.

The distributed ledger client receives boot recovery data from distributed ledger VNFs 322 over BBU circuitry 515-516. The distributed ledger client transfers the digital certificate from the boot recovery data to the hardware trust module for hardware-trust validation. The distributed ledger client transfers the boot recovery data to the boot loader. In BBU processing circuitry 513, the boot loader processes the boot recovery data to recover the boot functionality. For example, the boot recovery data may include a new boot file to replace a corrupt boot file.

Figure 6:
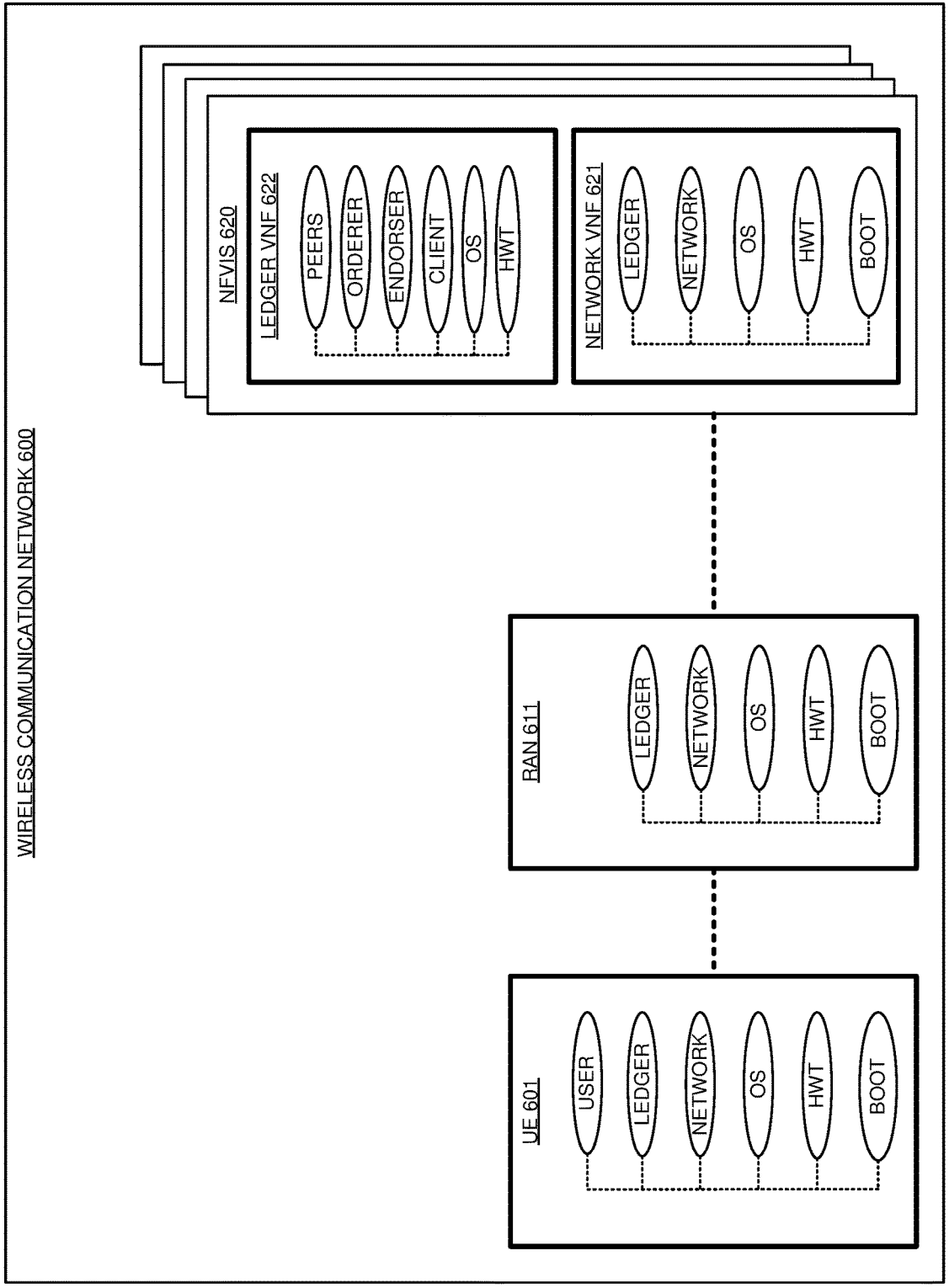
FIG. 6 illustrates a wireless communication network comprising distributed ledger VNFs that process boot data for VNFs, UEs, and RANs to assist the NFVIs, UEs, and RANs circuitry when recovering VNF, UE, and RAN boot functionality.

FIG. 6 illustrates wireless communication network 600 that comprises distributed ledger VNFs 622 that process boot data for UE 601, RAN 611, and VNF 621 to assist UE 601, RAN 611, NFVI 620, and VNF 621 when recovering UE, RAN, and VNF boot functionality. The hardware-trust modules in UE 601, RAN 611, network VNF 621, and ledger VNF 622 obtain hardware-trust digital certificates from a hardware-trust server (not shown). The boot loaders in UE 601, RAN 611, network VNF 621 transfer boot data and hardware-trust digital certificates to their local distributed ledger clients. The boot data for VNF 621 comprises a virtual boot file version ID. The boot data for RAN 611 comprises an RRH boot file version ID and a BBU boot file version ID. IN UE 601, RAN 611, and VNF 621, the boot loaders locally store loading data for the hardware-trust module, operating system, network applications and distributed ledger client.

In UE 601, RAN 611, and VNF 621, the distributed ledger clients transfer the boot data and hardware-trust digital certificates to the ledger client in distributed ledger VNF 622. In ledger VNF 622, the hardware-trust module validates the hardware-trust digital certificates. Distributed ledger VNF 622 comprises an endorser that processes chain code to execute test ledger transactions based on the boot data and endorses test transactions per ledger endorsement rules. When distributed ledger VNF 622 endorses a proposed ledger transaction, an orderer in VNF 644 distributes the endorsed ledger transactions to peers per orderer distribution rules. In VNF 622 and other ledger VNFs, the peers process the chain code to execute the endorsed ledger transactions and reach consensus. When the peers reach consensus on an individual ledger transaction, the peers commit the boot data and other transaction data to their immutable blockchain database. A peer transfers chain code output to the ledger client.

The loss of VNF 621 boot functionality comprises a failure to complete the virtual boot loading process due to a corrupt virtual boot file. When network VNF 621 loses VNF boot functionality, the virtual boot loader detects the loss and loads the hardware-trust module, operating system, and distributed ledger client. The virtual boot loader transfer a VNF boot request with a hardware-trust digital certificate to distributed ledger VNF 622 over the virtual operating system and ledger client application.

In ledger VNF 622, the hardware-trust module validates the hardware-trust digital certificate for the VNF boot request. Distributed ledger VNF 622 processes chain code to execute a test ledger transaction and generate VNF boot recovery data based on the boot request. When distributed ledger VNF 622 endorses the ledger transaction, an orderer in VNF 622 distributes the endorsed transaction to peers per orderer distribution rules. In VNF 622 and other ledger VNFs, the peers process the chain code to execute the ledger transaction to generate VNF boot recovery data and reach consensus. When the peers reach consensus on the ledger transaction, the peers commit the VNF boot request and VNF boot recovery data to the immutable blockchain database.

The peer transfers the VNF boot recovery data and other chain code output like a hardware-trust digital certificate to the ledger client. The ledger client in ledger VNF 622 transfers the boot recovery data and hardware-trust digital certificate to the ledger client in VNF 621. The ledger client transfers the hardware-trust digital certificate for ledger VNF 623 to the hardware-trust module for validation. The ledger client transfers the boot recovery data from ledger VNF 623 to the virtual boot loader. The virtual boot loader processes the boot recovery data to recover VNF boot functionality. For example, the recovery data may comprise a new virtual boot file. Recovered network VNF 621 then delivers the network communication service.

The loss of RAN boot functionality comprises a failure to complete the RRH or BBU boot loading process due to a corrupt RRH or BBU boot file. When RAN 611 loses RAN boot functionality, the RAN boot loader detects the loss and loads the hardware-trust module, operating system, and distributed ledger client. The RAN boot loader transfer a RAN boot request with a hardware-trust digital certificate to distributed ledger VNF 622 over the virtual operating system and ledger client application.

In ledger VNF 622, the hardware-trust module validates the hardware-trust digital certificate for the RAN boot request. Distributed ledger VNF 622 processes chain code to execute a test ledger transaction and generate RAN boot recovery data based on the boot request. When distributed ledger VNF 622 endorses the ledger transaction, an orderer in VNF 622 distributes the endorsed transaction to peers per orderer distribution rules. In VNF 622 and other ledger VNFs, the peers process the chain code to execute the ledger transaction to generate RAN boot recovery data and reach consensus. When the peers reach consensus on the ledger transaction, the peers commit the RAN boot request and RAN boot recovery data to the immutable blockchain database.

The peer transfers the RAN boot recovery data and other chain code output like a hardware-trust digital certificate to the ledger client. The ledger client in ledger VNF 622 transfers the boot recovery data and hardware-trust digital certificate to the ledger client in RAN 611. The RAN ledger client transfers the hardware-trust digital certificate for ledger VNF 622 to the hardware-trust module for validation. The RAN ledger client transfers the boot recovery data from ledger VNF 622 to the RAN boot loader. The RAN boot loader processes the boot recovery data to recover RAN boot functionality. For example, the recovery data may comprise a new RRH boot file. RAN 611 then supports the network communication service.

The loss of UE boot functionality comprises a failure to complete the UE boot loading process due to a corrupt UE boot file. When UE 601 loses UE boot functionality, the UE boot loader detects the loss and loads the hardware-trust module, operating system, network applications, and distributed ledger client. The UE boot loader transfers a UE boot request with a hardware-trust digital certificate to distributed ledger VNF 622 over the operating system, ledger client application, and network applications.

In ledger VNF 622, the hardware-trust module validates the hardware-trust digital certificate for the UE boot request. Distributed ledger VNF 622 processes chain code to execute a test ledger transaction and generate UE boot recovery data based on the UE boot request. When distributed ledger VNF 622 endorses the ledger transaction, an orderer in VNF 644 distributes the endorsed transaction to peers per orderer distribution rules. In VNF 622 and other ledger VNFs, the peers process the chain code to execute the ledger transaction to generate UE boot recovery data and reach consensus. When the peers reach consensus on the ledger transaction, the peers commit the boot request and boot recovery data to the immutable blockchain database.

The peer transfers the boot recovery data and other chain code output like a hardware-trust digital certificate to the ledger client. The ledger client in VNF 622 transfers the boot recovery data and hardware-trust digital certificate to the ledger client in UE 601. The UE ledger client transfers the hardware-trust digital certificate for ledger VNF 622 to the hardware-trust module for validation. The ledger client transfers the boot recovery data from ledger VNF 622 to the UE boot loader. The UE boot loader processes the boot recovery data to recover UE boot functionality. For example, the recovery data may comprise a new UE boot file. UE 601 then receives the network communication service.

The wireless data network circuitry described above comprises computer hardware and software that form special-purpose distributed ledger circuitry that processes boot data for VNFs to recover VNF boot functionality. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose distributed ledger circuitry that processes boot data for VNFs to recover VNF boot functionality.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data communication network comprising a network Virtual Network Function (VNF) that has VNF boot data, the method comprising:
    Network Function Virtualization Infrastructure (NFVI) circuitry executing the network VNF and responsively transferring the VNF boot data for delivery to distributed ledger circuitry;
    the distributed ledger circuitry executing a distributed ledger application and responsively performing a distributed ledger transaction with the VNF boot data and committing the VNF boot data to distributed ledger memory in a blockchain format;
    the NFVI circuitry executing the network VNF and responsively delivering a network communication service;
    the NFVI circuitry executing the network VNF and losing VNF boot functionality and responsively transferring a VNF boot request for delivery to the distributed ledger circuitry;
    the distributed ledger circuitry executing the distributed ledger application and responsively performing another distributed ledger transaction with the VNF boot request and the VNF boot data, transferring VNF recovery data for delivery to the NFVI circuitry, and committing the VNF boot request and the VNF recovery data to the distributed ledger memory in the blockchain format; and
    the NFVI circuitry processing the VNF recovery data and recovering the VNF boot functionality, executing the network VNF having the recovered VNF boot functionality, and responsively delivering the network communication service.

2. The method of claim 1 further comprising the NFVI circuitry executing the network VNF and responsively establishing hardware-trust with the distributed ledger circuitry executing the distributed ledger application.

3. The method of claim 1 wherein the VNF boot data comprises at least one of a VNF boot loader identifier and a VNF boot file identifier.

4. The method of claim 1 wherein the distributed ledger circuitry executing the distributed ledger application comprises the NFVI circuitry executing distributed ledger VNFs.

5. The method of claim 1 further comprising:
    Radio Access Network (RAN) circuitry executing a RAN application and responsively transferring RAN boot data to the distributed ledger circuitry;
    the distributed ledger circuitry executing the distributed ledger application and responsively performing another distributed ledger transaction with the RAN boot data and committing the RAN boot data to the distributed ledger memory in the blockchain format;
    the RAN circuitry executing the RAN application and responsively delivering the network communication service, losing RAN boot functionality, and responsively transferring a RAN boot request to the distributed ledger circuitry;
    the distributed ledger circuitry executing the distributed ledger application and responsively performing another distributed ledger transaction with the RAN boot request and the RAN boot data, transferring RAN recovery data to the RAN circuitry, and committing the RAN boot request and the RAN recovery data to the distributed ledger memory in the blockchain format; and
    the RAN circuitry processing the RAN recovery data and recovering the RAN boot functionality, executing the RAN application responsive to the recovered RAN boot functionality, and responsively delivering the network communication service.

6. The method of claim 5 wherein the RAN application boot data comprises at least one of a RAN boot loader identifier and a RAN boot file identifier.

7. The method of claim 5 further comprising the RAN circuitry executing the RAN application and responsively establishing hardware-trust with the distributed ledger circuitry executing the distributed ledger application.

8. The method of claim 1 further comprising:
    User Equipment (UE) circuitry executing a UE application and responsively transferring UE boot data to the distributed ledger circuitry;
    the distributed ledger circuitry executing the distributed ledger application and responsively performing another distributed ledger transaction with the UE boot data and committing the UE boot data to the distributed ledger memory in the blockchain format;
    the UE circuitry executing the UE application and responsively receiving the network communication service, losing UE boot functionality, and responsively transferring a UE boot request to the distributed ledger circuitry;
    the distributed ledger circuitry executing the distributed ledger application and responsively performing another distributed ledger transaction with the UE boot request and the UE boot data, transferring UE recovery data to the UE circuitry, and committing the UE boot request and the UE recovery data to the distributed ledger memory in the blockchain format; and
    the UE circuitry processing the UE recovery data and responsively recovering the UE boot functionality, executing the UE application responsive to the recovered UE boot functionality, and responsively receiving the network communication service.

9. The method of claim 8 wherein the UE boot data comprises at least one of a UE boot loader identifier and a UE boot file identifier.

10. The method of claim 8 further comprising the UE circuitry executing the UE application and responsively establishing hardware-trust with the distributed ledger circuitry executing the distributed ledger application.

11. A data communication network comprising a network Virtual Network Function (VNF) that has VNF boot data, the data communication network comprising:
Network Function Virtualization Infrastructure (NFVI) circuitry configured to execute the network VNF and responsively transfer the VNF boot data for delivery to distributed ledger circuitry;
the distributed ledger circuitry configured to execute a distributed ledger application and responsively perform a distributed ledger transaction with the VNF boot data and commit the VNF boot data to distributed ledger memory in a blockchain format;
the NFVI circuitry configured to execute the network VNF and responsively deliver a network communication service;
the NFVI circuitry configured to execute the network VNF and lose VNF boot functionality and responsively transfer a VNF boot request for delivery to the distributed ledger circuitry;
the distributed ledger circuitry configured to execute the distributed ledger application and responsively perform another distributed ledger transaction with the VNF boot request and the VNF boot data, transfer VNF recovery data for delivery to the NFVI circuitry, and commit the VNF boot request and the VNF recovery data to the distributed ledger memory in the blockchain format; and
the NFVI circuitry configured to process the VNF recovery data and recover the VNF boot functionality, execute the network VNF having the recovered VNF boot functionality, and responsively deliver the network communication service.

12. The data communication network of claim 11 further comprising the NFVI circuitry configured to execute the network VNF and responsively establish hardware-trust with the distributed ledger circuitry configured to execute the distributed ledger application.

13. The data communication network of claim 11 wherein the VNF boot data comprises at least one of a VNF boot loader identifier and a VNF boot file identifier.

14. The data communication network of claim 11 wherein the distributed ledger circuitry configured to execute the distributed ledger application comprises the NFVI circuitry configured to execute distributed ledger VNFs.

15. The data communication network of claim 11 further comprising:
Radio Access Network (RAN) circuitry configured to execute a RAN application and responsively transfer RAN boot data to the distributed ledger circuitry;
the distributed ledger circuitry configured to execute the distributed ledger application and responsively perform another distributed ledger transaction with the RAN boot data and commit the RAN boot data to the distributed ledger memory in the blockchain format;
the RAN circuitry configured to execute the RAN application and responsively deliver the network communication service, lose RAN boot functionality, and responsively transfer a RAN boot request to the distributed ledger circuitry;
the distributed ledger circuitry configured to execute the distributed ledger application and responsively perform another distributed ledger transaction with the RAN boot request and the RAN boot data, transfer RAN recovery data to the RAN circuitry, and commit the RAN boot request and the RAN recovery data to the distributed ledger memory in the blockchain format; and
the RAN circuitry configured to process the RAN recovery data and recover the RAN boot functionality, execute the RAN application responsive to the recovered RAN boot functionality, and responsively deliver the network communication service.

16. The data communication network of claim 15 wherein the RAN application boot data comprises at least one of a RAN boot loader identifier and a RAN boot file identifier.

17. The data communication network of claim 15 further comprising the RAN circuitry configured to execute the RAN application and responsively establish hardware-trust with the distributed ledger circuitry configured to execute the distributed ledger application.

18. The data communication network of claim 11 further comprising:
User Equipment (UE) circuitry configured to execute a UE application and responsively transfer UE boot data to the distributed ledger circuitry;
the distributed ledger circuitry configured to execute the distributed ledger application and responsively perform another distributed ledger transaction with the UE boot data and commit the UE boot data to the distributed ledger memory in the blockchain format;
the UE circuitry configured to execute the UE application and responsively receive the network communication service, lose UE boot functionality, and responsively transfer a UE boot request to the distributed ledger circuitry;
the distributed ledger circuitry configured to execute the distributed ledger application and responsively perform another distributed ledger transaction with the UE boot request and the UE boot data, transfer UE recovery data to the UE circuitry, and commit the UE boot request and the UE recovery data to the distributed ledger memory in the blockchain format; and
the UE circuitry configured to execute process the UE recovery data and responsively recover the UE boot functionality, execute the UE application responsive to the recovered UE boot functionality, and responsively receive the network communication service.

19. The data communication network of claim 18 wherein the UE boot data comprises at least one of a UE boot loader identifier and a UE boot file identifier.

20. The data communication network of claim 18 further comprising the UE circuitry configured to execute the UE application and responsively establish hardware-trust with the distributed ledger circuitry configured to execute the distributed ledger application.

* * * * *